US009533279B2

(12) United States Patent
Tachino et al.

(10) Patent No.: US 9,533,279 B2
(45) Date of Patent: Jan. 3, 2017

(54) METHOD AND APPARATUS FOR MANUFACTURING TRICHLOROSILANE

(75) Inventors: Noboru Tachino, Yokkaichi (JP); Hisayuki Takesue, Yokkaichi (JP); Harumi Satoh, Yokkaichi (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 120 days.

(21) Appl. No.: 12/379,702

(22) Filed: Feb. 26, 2009

(65) Prior Publication Data

US 2009/0220403 A1 Sep. 3, 2009

(30) Foreign Application Priority Data

Feb. 29, 2008 (JP) ................................. 2008-049229

(51) Int. Cl.
*C01B 33/107* (2006.01)
*B01J 19/24* (2006.01)
*B01J 19/00* (2006.01)

(52) U.S. Cl.
CPC ............. *B01J 19/24* (2013.01); *B01J 19/0053* (2013.01); *C01B 33/10757* (2013.01); *B01J 2219/00063* (2013.01); *B01J 2219/00135* (2013.01); *B01J 2219/00159* (2013.01)

(58) Field of Classification Search
CPC .. C01B 33/02; C01B 33/027; C01B 33/10763; C01B 33/1071; C01B 33/10757
USPC ........................................ 423/341, 342, 350
See application file for complete search history.

(56) References Cited

U.S. PATENT DOCUMENTS

| | | | | |
|---|---|---|---|---|
| 3,607,125 A * | 9/1971 | Kydd | ............................. | 422/625 |
| 3,647,758 A | 3/1972 | Ryffel et al. | | |
| 3,878,234 A * | 4/1975 | Atwell et al. | .................. | 556/468 |
| 4,165,363 A | 8/1979 | Weigert et al. | | |
| 4,244,935 A | 1/1981 | Dell | | |
| 4,321,246 A * | 3/1982 | Sarma | ................... | C01B 33/107 136/258 |
| 4,526,769 A * | 7/1985 | Ingle et al. | .................... | 423/342 |
| 4,900,531 A | 2/1990 | Levin | | |
| 5,118,485 A * | 6/1992 | Arvidson et al. | ............. | 423/342 |

(Continued)

FOREIGN PATENT DOCUMENTS

| | | |
|---|---|---|
| JP | 01-188414 | 7/1989 |
| JP | 3615722 B2 | 2/2005 |

(Continued)

OTHER PUBLICATIONS

European Search Report dated May 27, 2009, issued on the corresponding European patent application No. 09153800.9.

(Continued)

*Primary Examiner* — Ngoc-Yen Nguyen
(74) *Attorney, Agent, or Firm* — Locke Lord LLP

(57) ABSTRACT

A method and an apparatus for manufacturing trichlorosilane are disclosed. A polymer containing high boiling chlorosilane compounds that are generated in a polycrystalline silicon manufacturing process are mixed with hydrogen chloride and introduced into a decomposition furnace. The polymer and the hydrogen chloride are reacted at a temperature of 450° C., and preferably of 450° C. or more and 700° C. or less. Preferably a mixture containing the polymer and hydrogen chloride of 10 to 30 mass % with respect to the weight of the polymer is introduced into the decomposition furnace.

2 Claims, 3 Drawing Sheets

(56) References Cited

U.S. PATENT DOCUMENTS

| | | | |
|---|---|---|---|
| 5,118,486 A | | 6/1992 | Burgie et al. |
| 5,292,912 A | * | 3/1994 | Chadwick et al. ............ 556/468 |
| 6,344,578 B1 | * | 2/2002 | Mautner et al. .............. 556/468 |
| 2002/0183537 A1 | | 12/2002 | Streckel et al. |
| 2003/0147798 A1 | | 8/2003 | Kirii et al. |
| 2004/0131528 A1 | | 7/2004 | Kendig et al. |
| 2004/0175323 A1 | * | 9/2004 | Franz et al. .................. 423/486 |
| 2009/0142246 A1 | * | 6/2009 | Masuda et al. ............... 423/342 |

FOREIGN PATENT DOCUMENTS

| | | |
|---|---|---|
| JP | 4038110 B2 | 1/2008 |
| KR | 20070094854 A | 9/2007 |
| WO | WO-02/12122 | 2/2002 |

OTHER PUBLICATIONS

European Search Report dated Jul. 5, 2012, issued for the corresponding European Patent Application No. 11164834.1.
Office Action dated Feb. 28, 2014, issued for the European patent application No. 11 164 834.1.
Decision for Grant of Patent dated Oct. 8, 2015 issued for corresponding Korean Patent Application No. 10-2009-0015858.

* cited by examiner

METHOD AND APPARATUS FOR MANUFACTURING TRICHLOROSILANE

BACKGROUND OF THE INVENTION

Field of the Invention

The present invention relates to a method and an apparatus for manufacturing trichlorosilane by decomposing compounds (hereinbelow, referred to as "polymers") containing high-boiling chlorosilane, which are generated in a polycrystalline silicon manufacturing process. In particular, the present invention relates to a method and an apparatus for manufacturing trichlorosilane by decomposing polymers that have been separated in a chlorination step or polymers that have been separated from an exhaust gas of a polycrystalline silicon manufacturing process.

Priority is claimed on Japanese Patent Application No. 2008-049229, filed Feb. 29, 2008, the content of which is incorporated herein by reference.

Description of Related Art

The high-purity polycrystalline silicon that can be used as a semiconductor material is mainly manufactured by the Siemens process in which, for example, trichlorosilane ($SiHCl_3$; abbreviated "TCS") and hydrogen are used as raw materials, a gas mixture thereof is introduced into a reactor and brought into contact with heated silicon rods, and silicon is deposited on the surfaces of the silicon rods due to the hydrogen reduction or thermal decomposition of the trichlorosilane at a high temperature.

The high purity trichlorosilane to be introduced into the reactor, for example, is manufactured by introducing metallurgical grade silicon and hydrogen chloride into a fluidized-bed chlorination furnace to react them, chlorinating the silicon to produce crude TCS (chlorination step), and purifying the crude TCS by distillation into high purity TCS.

In the manufacture of polycrystalline silicon, the reactor exhaust gas includes, in addition to unreacted trichlorosilane, hydrogen, and hydrogen chloride, by-products such as silicon tetrachloride (STC) and chlorosilanes including, for example, tetrachlorodisilane ($Si_2H_2Cl_4$) and hexachlorodisilane ($Si_2Cl_6$). (Patent Document 1: PCT International Publication WO 02/012122) The chlorosilanes have boiling point higher than that of silicon tetrachloride, and they are referred to herein as "high boiling chlorosilanes". Also, the gas produced in the chlorination reactor includes, in addition to trichlorosilane and unreacted hydrogen chloride, by-products such as silicon tetrachloride and high-boiling chlorosilanes.

Conventionally, when the gas that has been produced in the chlorination reactor is purified by distillation, separated polymers undergo a hydrolytic process and are then discarded. The exhaust gas of the reactor is introduced into a recovery distillation column, and after the polymers have been separated, the exhaust gas is returned to the distillation step of the chlorination step and recycled. However, the separated polymers undergo a hydrolytic process and are then discarded. Thus, there is problem in that the hydrolytic and the waste disposal processes are costly.

A method is known in which the polymers generated in the manufacture of polycrystalline silicon are returned to the fluidized-bed chlorination furnace and then decomposed and used in the manufacture of trichlorosilane (Patent Document 2: Japanese Unexamined Patent Application, First Publication No. H01-188414). However, in this method, because the silicon powder and polymers supplied to the chlorination reactor are mixed, there is a problem that the fluidity of the silicon powder is reduced and the conversion rate of the silicon powder to chlorosilanes is lowered.

SUMMARY OF THE INVENTION

The present invention solves the above problems in the conventional polycrystalline silicon manufacture, and provides a manufacturing technology in which polymers separated from crude TCS in the chlorination step and polymers separated from the exhaust gas in the reactor are decomposed and converted to trichlorosilane.

The present invention relates to a method and an apparatus for manufacturing trichlorosilane that solves the problems described above by using the following features.

[1] A method for manufacturing trichlorosilane comprising: mixing polymers and hydrogen chloride, introducing a mixture thereof to a decomposition furnace, and reacting the polymers and the hydrogen chloride at a temperature of 450° C. or more.

[2] A method for manufacturing trichlorosilane according to the aspect [1], wherein, in a decomposition furnace, polymers and hydrogen chloride are reacted at a temperature of 450° C. or more and 700° C. or less.

[3] A method for manufacturing trichlorosilane according to the aspect [1] or [2], wherein the polymer is at least one of a compound that has been separated from a gas produced in a chlorination reactor that produces trichlorosilane by reacting hydrogen chloride and metallurgical grade silicon, and a compound that has been separated from an exhaust gas from a reactor that manufactures polycrystalline silicon by bringing a gas mixture containing trichlorosilane and hydrogen into contact with heated silicon.

[4] A method for manufacturing trichlorosilane according to any one of the aspects [1] to [3], wherein a mixture containing the polymer and hydrogen chloride of 10 to 30 mass % with respect to the weight of the polymer is introduced into the decomposition furnace.

[5] A method for manufacturing trichlorosilane according to any one of the aspects [1] to [3], wherein a mixture containing the polymer, which contains high-boiling chlorosilanes of 20 to 50 mass % thereof, and hydrogen chloride of 10 to 30 mass % with respect to the weight of the polymer, is introduced into the decomposition furnace, and the polymer and hydrogen chloride are reacted at a temperature of 450° C. or more and 700° C. or less.

[6] An apparatus for manufacturing trichlorosilane comprising: a decomposition furnace that produces trichlorosilane by heating and decomposing a mixture of polymers and hydrogen chloride, a supply device that introduces the mixture into the decomposition furnace, an exhaust device that discharges the produced gas outside the decomposition furnace, a device that heats the inside of the decomposition furnace, and a control device that controls the temperature inside the decomposition furnace.

[7] An apparatus for manufacturing trichlorosilane according to the aspect [6] wherein at least a part of a supply pipe for the mixture is provided so as to pass through the inside of the decomposition furnace, and the mixture is preheated while flowing through the supply pipe in the furnace.

[8] An apparatus for manufacturing trichlorosilane according to the aspect [5] or [6], wherein at least a part of a supply pipe for the mixture is provided so as to pass through the inside of the decomposition furnace in a spiral shape or a meandering (serpentine) shape, the mixture is preheated while flowing through the supply pipe, the preheated mixture is supplied into the decomposition furnace from the supply pipe, and the polymers and the hydrogen chloride are reacted at a temperature of 450° C. or more and 700° C. or less.

The method of the present invention is a method for manufacturing trichlorosilane by decomposing polymers, and for example, enables recovering trichlorosilane by decomposing polymers that have been separated in a polycrystalline silicon manufacturing process, enables significantly reducing the load incurred due to carrying out waste disposal by hydrolytic the polymers, increases the consumption efficiency of raw materials by recycling the recovered trichlorosilane, and enables the reduction of the polycrystalline silicon manufacturing cost.

Specifically, the manufacturing method of the present invention, for example, enables recovering trichlorosilane by decomposing at least one of a polymer that has been separated in a chlorination step in a polycrystalline silicon manufacturing process and a polymer that has been separated from an exhaust gas of a reactor. The recovered trichlorosilane can be recycled as a raw material for manufacturing polycrystalline silicon.

The manufacturing apparatus of the present invention is provided with a decomposition furnace that produces trichlorosilane by heating and decomposing polymers, and because trichlorosilane is manufactured by mixing the polymers and hydrogen chloride and reacting the mixture at a predetermined temperature, it is possible to manufacture trichlorosilane by using the polymers that have been separated in the chlorination step or the polymers that have been separated from the exhaust gas of the reactor.

In the case where at least a part of a supply pipe for the mixture is provided so as to pass through the inside of the decomposition furnace, the mixture is preheated while flowing through the supply pipe inside the furnace, and it is possible to react the mixture efficiently and to increase the yield of the trichlorosilane.

DETAILED DESCRIPTION OF THE INVENTION

Below, the present invention will be explained concretely based on the embodiments.

The method of the present invention is a method for manufacturing trichlorosilane, wherein high-boiling chlorosilane-containing compounds (referred to herein as "polymers"), which have been generated in a polycrystalline silicon manufacturing process, are mixed with hydrogen chloride and introduced into a decomposition furnace, the polymers and the hydrogen chloride are reacted at a temperature of 450° C. or more, or preferably, of 450° C. or more and 700° C. or less, and the trichlorosilane is thereby manufactured.

For example, the decomposition process includes the following reactions.

(1) Decomposition of tetrachlorodisilane: $Si_2H_2Cl_4$

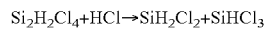
$Si_2H_2Cl_4 + HCl \rightarrow SiH_2Cl_2 + SiHCl_3$

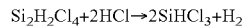
$Si_2H_2Cl_4 + 2HCl \rightarrow 2SiHCl_3 + H_2$ (2) Decomposition of hexachlorodisilane: $Si_2Cl_6$

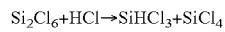
$Si_2Cl_6 + HCl \rightarrow SiHCl_3 + SiCl_4$

Polymers may include other compounds such as pentachlorodisilane ($Si_2HCl_5$) and octachlorotrisilane ($Si_3Cl_8$). These compounds can also be decomposed by reacting with hydrogen chloride as well as the reactions (1) and (2).

Figure 1:
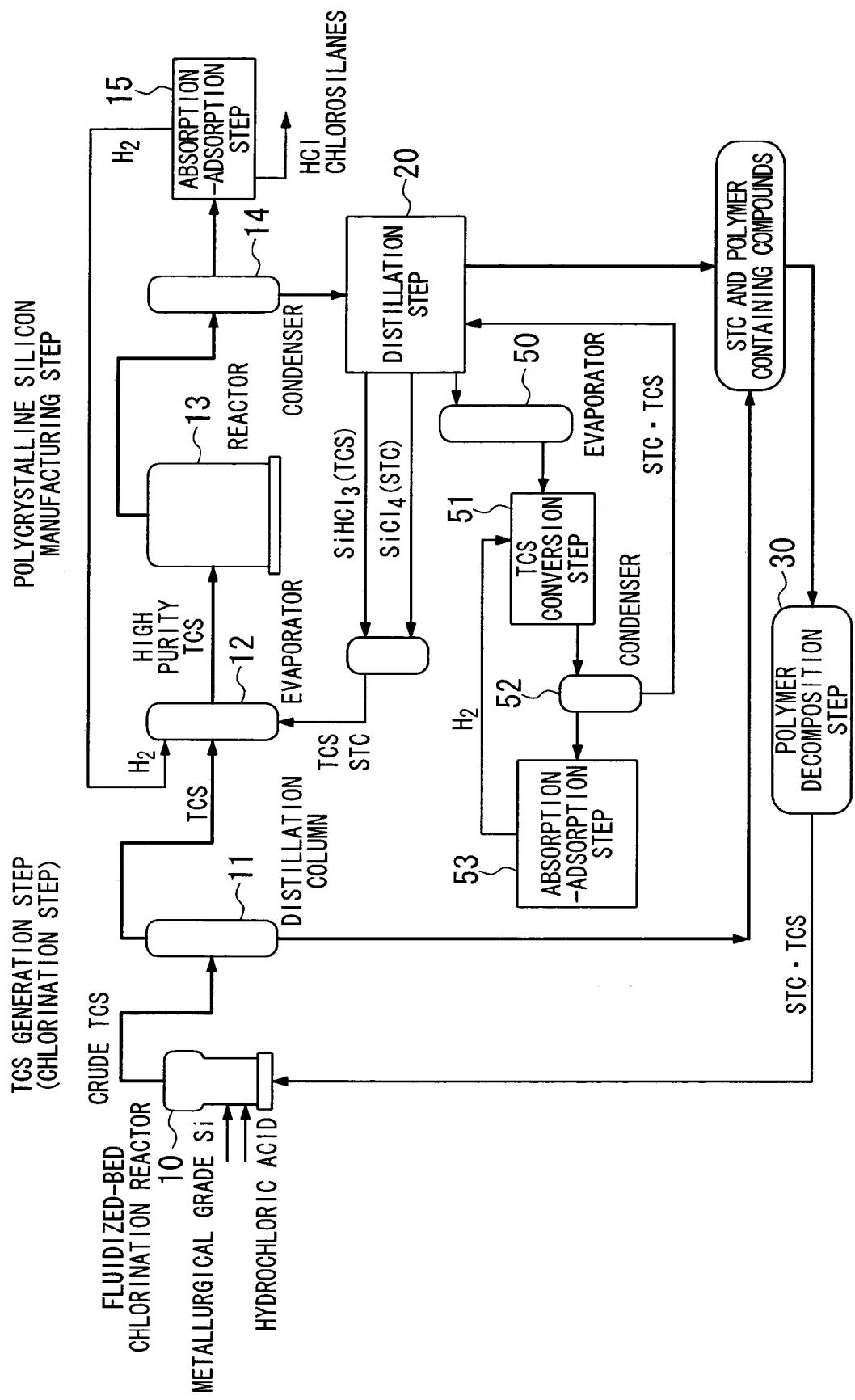
FIG. 1 is a flow diagram that shows a manufacturing method for polycrystalline silicon.

The manufacturing method of the present invention can be applied to polymers that are separated in a manufacturing process for polycrystalline silicon. An example of a process for polycrystalline silicon manufacture is shown in FIG. 1. The illustrated manufacturing system includes a fluidized-bed chlorination furnace 10 that produces crude (unrefined) TCS by reacting a metallurgical grade silicon and hydrogen chloride; a first distillation column 11 that distils the produced chlorosilanes including the crude TCS produced by the chlorination reactor 10; an evaporator 12 that evaporates purified TCS along with hydrogen, STC, and TCS that are recovered from the downstream processes to prepare raw material gas; a reactor 13 that manufactures polycrystalline silicon from the raw material gas; and a condenser 14 that separates the chlorosilanes from the exhaust gas of the reactor 13.

The metallurgical grade silicon and the hydrogen chloride are introduced into the fluidized-bed chlorination furnace 10, and, in a fluidized state, metallurgical grade silicon and hydrogen chloride are reacted to produce crude TCS. At this time, polymers are also generated. The produced chlorosilanes, which includes crude TCS, by-products, and unreacted hydrogen chloride and the like, is introduced into the distillation column 11 from the fluidized-bed chlorination furnace 10, and the crude TCS is purified by distillation. The purified TCS is introduced into the evaporator 12 from the distillation column 11, and at the same time, the distillation residue in the distillation column 11 is separated from the column bottom. The distillation residue includes polymers generated in the above process and the like, and distillation residue including the polymers are fed to the polymer decomposition step 30 according to an embodiment of the present invention.

The TCS, which has been introduced from the distillation column 11, and the hydrogen, STC, and TCS, which have been recovered from the downstream steps, are introduced into the evaporator 12, and a raw material gas in which these are mixed is prepared. This raw material gas is introduced into the reactor 13. Inside the reactor 13, plural silicon rods are stood, these silicon rods are heated to a temperature of 900° C. or more and 1200° C. or less, the raw material gas is brought into contact with surfaces of the heated silicon rods, and silicon is deposited thereon due to the hydrogen reduction and thermal decomposition of the TCS.

The exhaust gas of the reactor 13 contains, in addition to unreacted TCS, hydrogen, hydrogen chloride, and STC, high-boiling chlorosilanes such as tetrachlorodisilane and hexachlorodisilane that have been produced in the reactor 13. This exhaust gas is introduced into the condenser 14, cooled to a temperature of about −50° C., and the chlorosilanes, which include the polymers, are liquefied and thereby separated from the exhaust gas. The liquid that includes the chlorosilanes that have been separated by the condenser 14 is introduced into the distillation step 20. At the same time, hydrogen and hydrogen chloride and the like are included in the gas that has been extracted from the condenser 14, this gas is introduced into an absorption-adsorption step, and the hydrogen is thereby separated. This separated hydrogen is returned to the evaporator 12 and recycled as a raw material gas component.

In the distillation step 20, the TCS and the STC included in the liquid are stepwise distilled and separated from the polymers. The separated TCS and STC are returned to the evaporator 12 and recycled as a raw material gas component.

In the distillation step 20, a portion of the distilled chlorosilanes including the separated STC can be used as a raw material for generating TCS. For example, a portion of the distilled chlorosilanes including STC that has been separated in the distillation step 20 is introduced into the TCS conversion step 51 via the evaporator 50. In the TCS conversion step 51, STC (silicon tetrachloride) and hydrogen are reacted at a high temperature of 800° C. or more and 1300° C. or less to produce TCS (trichlorosilane). A gas including the produced TCS is introduced into a condenser 52, and cooled to a temperature of about −50° C. in the condenser 52. The TCS and STC and the like are liquefied and thereby separated from the gas. The separated liquid is returned to the distillation step 20. The TCS and STC that have been recovered in the distillation step 20 by distillation are returned to the evaporator 12 and recycled. In contrast, the gas that has been extracted from the condenser 52 is introduced into the absorption-adsorption step 53, and the hydrogen that is included in the gas is recovered. The recovered hydrogen is returned to the TCS conversion step 51 and recycled.

In this manner, in the process in which the TCS conversion step 51 is provided, polymers that are included in the exhaust gas of the reactor 13 and the polymers that have been generated in the TCS conversion process are included in the distillation residue that is separated in the distillation step 20, and these polymers (distillation residue) can be introduced into the polymer decomposition step 30 according to the embodiment of the present invention and decomposed.

The high-boiling chlorosilanes are generally included at about 20 to 50 mass % in the distillation residue that is separated by the distillation column 11 in the chlorination step and the distillation residue that is separated in the distillation step 20. Specifically, the distillation residue that is separated in the distillation step 20 includes, for example, about 1 to 3 mass % TCS, about 50 to 70 mass % STC, about 12 to 20 mass % $Si_2H_2Cl_4$, about 13 to 22 mass % $Si_2Cl_6$, and about 3 to 6 mass % other high-boiling chlorosilanes. In the manufacturing method of this embodiment, these polymers are decomposed and converted to trichlorosilane (TCS).

Figure 2:
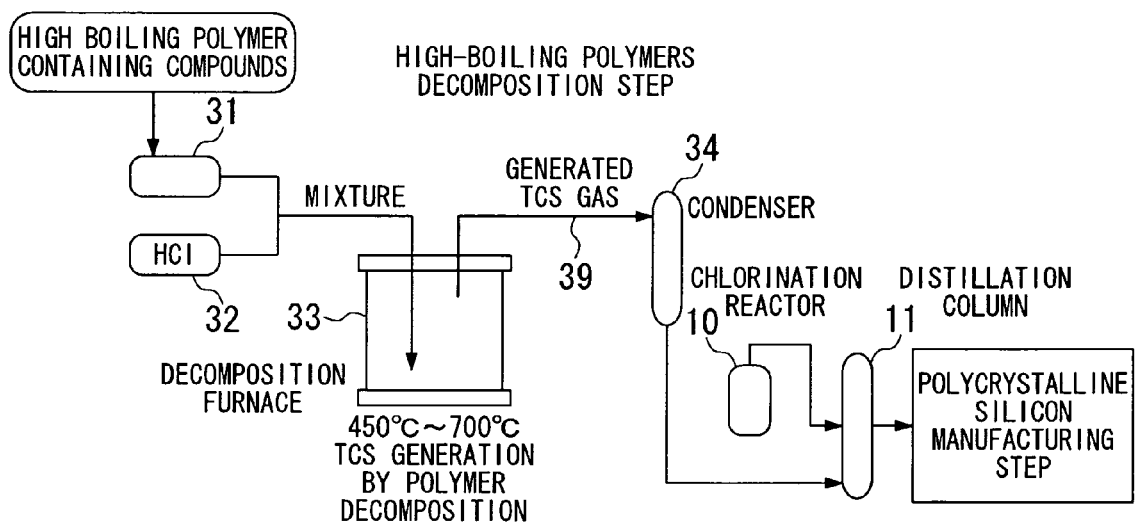
FIG. 2 is a flow diagram that shows the polymer decomposition step in the manufacturing method according to an embodiment of the present invention.
Figure 3:
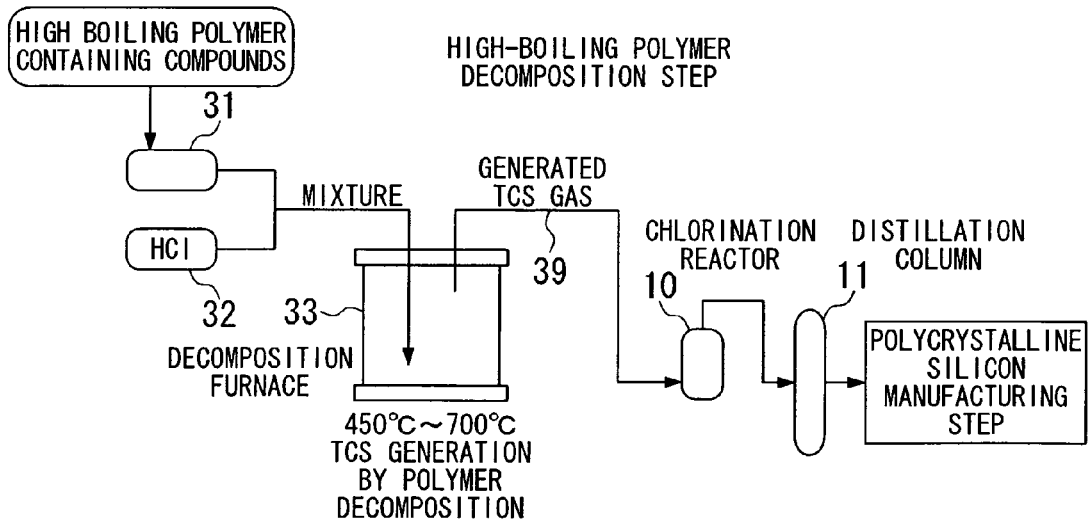
FIG. 3 is a flow diagram that shows the polymer decomposition step according to another embodiment of the present invention.

The polymer decomposition step 30 for polymers is shown in FIG. 2 and FIG. 3. In the decomposition step shown in FIG. 2, a cylinder 31 that retains the polymers, a hydrogen chloride tank 32, a decomposition furnace 33, and a condenser 34 are provided. The polymers (distillation residue) that are separated from the crude TCS in the chlorination step shown in FIG. 1 and the polymers (distillation residue) that have been separated from the exhaust gas of the reactor 13 are accumulated in the cylinder 31. In addition, the hydrogen chloride gas is retained in the tank 32.

The gas including the TCS produced in the decomposition step 33 is fed to the condenser 34 through the discharge pipe 39, cooled to a temperature of about 30° C. to about 8° C., and a condensate that includes TCS is recovered. The recovered condensate is introduced into the distillation column 11 that purifies the crude TCS-containing gas of the chlorination step, the recovered TCS is purified with the crude TCS that was produced by the chlorination reactor 10, and this purified TCS can then be recycled. The STC that has been produced by the decomposition furnace 33 is recovered via the condenser 34, introduced into the polycrystalline silicon manufacturing step, and can thereby be recycled.

Figure 4:
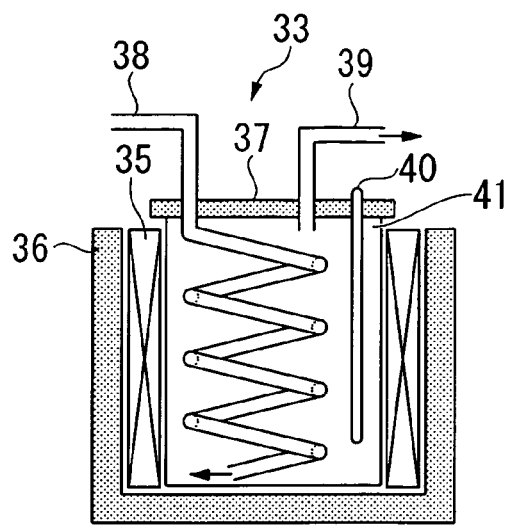
FIG. 4 is a longitudinal cross-sectional drawing of the decomposition furnace.

In the decomposition step shown in FIG. 3, the gas including the TCS produced in the decomposition furnace 33 is introduced into the chlorination reactor 10 for the polycrystalline silicon manufacturing step via the discharge pipe 39 shown in FIG. 4. The metallurgical grade silicon and the hydrogen chloride are reacted in the chlorination reactor 10, and the gas including the TCS is recycled as a portion of the raw material for generating the crude TCS.

In the polymer decomposition step 30 shown in FIG. 2 and FIG. 3, the polymer containing liquid is mixed with the hydrogen chloride gas and introduced into the decomposition furnace 33. Regarding the ratio of the polymers and hydrogen chloride in this mixture, the ratio of the weight of hydrogen chloride with respect to the weight of the polymer is preferably 10 to 30 mass %. When the amount of hydrogen chloride exceeds this ratio, the unreacted hydrogen chloride increases, and this is not preferable. In contrast, when the amount of the polymers exceeds this ratio, powdered silicon is generated in large amounts, the facility maintenance load increases, and the operating efficiency is reduced.

In the decomposition furnace 33, the polymers are reacted with hydrogen chloride at a high temperature of 450° C. or more and thereby converted to trichlorosilane (TCS). The reaction temperature in the reactor is 450° C. or more, and preferably 450° C. or more and 700° C. or less. When the temperature in the furnace is lower than 450° C., the decomposition of the polymers does not progress sufficiently. When the temperature in the furnace rises above 700° C., a reaction occurs in which the produced trichlorosilane reacts with the hydrogen chloride to produce silicon tetrachloride (STC), and this is not preferable because the recovery efficiency of the TCS will be decreased.

Figure 5:
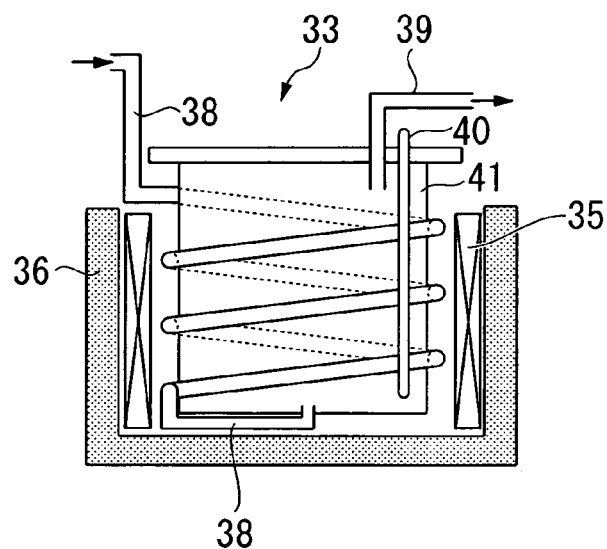
FIG. 5 is a longitudinal cross-sectional drawing of another decomposition furnace.
Figure 6:
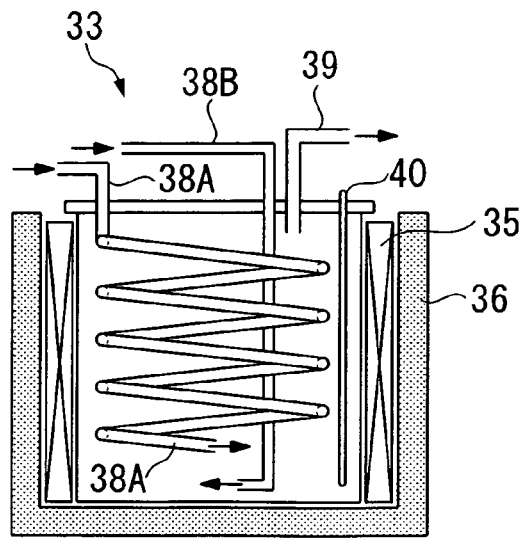
FIG. 6 is a longitudinal cross-sectional drawing of another decomposition furnace.

A schematic longitudinal cross-sectional view of the decomposition furnace 33 is shown in FIG. 4 to FIG. 6. In the illustrated example of the apparatus, the decomposition furnace 33 has a cylindrical furnace body 41 and a cylindrical heater 35 surrounding the outer periphery of the cylindrical furnace body 41, and the entire decomposition furnace 33 is accommodated inside a cylindrical vessel 36 that is formed by an insulating material. The furnace body 41 is sealed by a lid 37, and a supply pipe 38 (supply device) that supplies a mixed liquid containing polymers and hydrogen chloride into the furnace and a discharge pipe 39 (gas exhaust device) that discharges the produced gas to the outside of the furnace are provided. Furthermore, a thermometer 40 is installed in the furnace body 41.

In the decomposition furnace 33 shown in FIG. 4, the supply pipe 38 passing through the lid 37 is provided so as to extend to the inside of the furnace body 41. The supply pipe 38 has a spiral shape, and the distal end opening thereof is positioned near the bottom of the decomposition furnace 33. The portion of the supply pipe 38 that extends into the furnace is not limited to a spiral shape, but may also have, for example, a meandering (serpentine) shape.

In the decomposition furnace 33 shown in FIG. 4, because the mixture containing polymers and hydrogen chloride is preheated while flowing through the supply pipe 38 passing through the inside of the decomposition furnace 33, the TCS generating reaction progresses and the recovery rate for the TCS can thereby be increased. Note that if the mixture containing polymers and hydrogen chloride is preheated before being supplied to the decomposition furnace, there is a possibility that the polymers will remain inside the preheated portion of the pipe.

In the decomposition furnace 33 shown in FIG. 5, the supply pipe 38 is provided with a spiral shape so as to surround the outer periphery of the furnace body 41, and the lower end of the supply pipe 38 opens at the bottom portion of the furnace. According to this structure, there is an advantage in that because the spiral portion of the supply pipe 38 is close to the heater 35, the pre-heating effect is significant.

The decomposition furnace 33 shown in FIG. 6 has a structure in which the polymer containing liquid and the hydrogen chloride are supplied into the decomposition furnace by passing through separate supply pipes. The polymer containing liquid is supplied into the furnace through the supply pipe 38A, and the hydrogen chloride is supplied into the furnace through the supply pipe 38B. Thus, the polymer containing liquid and the hydrogen chloride are mixed inside the furnace. In the present specification, the expression stating that the polymers and the hydrogen chloride are mixed and then introduced into the decomposition furnace, as shown in FIG. 6, also includes the case in which they are supplied into the furnace through separate supply pipes are mixed inside the furnace.

In the decomposition furnace 33 shown in FIG. 6, the supply pipe 38A, through which the polymer containing liquid flows, extends into the furnace by meandering in a spiral shape as shown in the figure, the polymer containing liquid is preheated while flowing through the supply pipe 38A into the furnace, the hydrogen chloride is preheated while flowing through the supply pipe 38B inside the furnace, and thus the reaction efficiency can thereby be increased. In addition, because the polymers and the hydrogen chloride are not mixed during the pre-heat, they do not react with each other during pre-heat, and thus there is no concern that shortcomings such as the reactants adhering to and obstructing the inside of the pipes will occur.

EXAMPLES

Examples 1 to 8

The polymers that have been separated in the chlorination step and the distillation step for the exhaust gas in the reactor are introduced into the polymer decomposition step shown in FIG. 2. The polymers are mixed with hydrogen chloride gas and introduced into the decomposition furnace shown in FIG. 3, and they are heated to a temperature of 450° C. or more and 700° C. or less and reacted to produce TCS. TABLE 1 and TABLE 2 show the composition of the polymers before being mixed with the hydrogen chloride, the composition (%) of the decomposed gas that is extracted from the decomposing furnace, the decomposition temperature, and the amount of the polymers and the hydrogen chloride. The numerical values for the mass % in the tables are values that have been calculated based on the area %.

TABLE 1

| COMPOSITION | EXAMPLE 1 BEFORE DECOMPOSITION MASS % | EXAMPLE 1 AFTER DECOMPOSITION MASS % | EXAMPLE 2 BEFORE DECOMPOSITION MASS % | EXAMPLE 2 AFTER DECOMPOSITION MASS % | EXAMPLE 3 BEFORE DECOMPOSITION MASS % | EXAMPLE 3 AFTER DECOMPOSITION MASS % | EXAMPLE 4 BEFORE DECOMPOSITION MASS % | EXAMPLE 4 AFTER DECOMPOSITION MASS % |
|---|---|---|---|---|---|---|---|---|
| $SiH_2Cl_2$ | 0.1 | 0.2 | 0.2 | 0.3 | 0.1 | 0.1 | 0.1 | 0.2 |
| $SiHCl_3$ | 1.0 | 26.9 | 2.0 | 22.6 | 1.6 | 20.7 | 0.9 | 15.5 |
| $SiCl_4$ | 58.8 | 69.1 | 62.4 | 73.8 | 52.6 | 74.0 | 57.2 | 69.7 |
| $Si_2H_2Cl_4$ | 15.6 | 0.1 | 17.1 | 0.3 | 13.4 | 0.5 | 13.1 | 5.4 |
| $Si_2Cl_6$ | 20.6 | 0.4 | 16.8 | 0.2 | 22.8 | 0.7 | 21.8 | 1.1 |
| OTHERS | 3.9 | 3.3 | 1.5 | 2.8 | 9.5 | 4.0 | 6.9 | 8.1 |
| POLYMER INPUT AMOUNT | 200 g/min | | 200 g/min | | 200 g/min | | 200 g/min | |
| HCl GAS INPUT AMOUNT | 40 g/min | | 30 g/min | | 60 g/min | | 20 g/min | |
| DECOMPOSITION FURNACE TEMPERATURE | 520° C. | | 520° C. | | 600° C. | | 450° C. | |
| PRECIPITATION | SMALL AMOUNT | | SMALL AMOUNT | | SMALL AMOUNT | | SMALL AMOUNT | |

(Note)
The expression "before decomposition" denotes the composition of the polymer containing liquid before being mixed with hydrogen chloride.
The expression "after decomposition" denotes the composition of the gas that has been extracted from the decomposition furnace.

TABLE 2

| COMPOSITION | EXAMPLE 5 BEFORE DECOMPOSITION MASS % | EXAMPLE 5 AFTER DECOMPOSITION MASS % | EXAMPLE 6 BEFORE DECOMPOSITION MASS % | EXAMPLE 6 AFTER DECOMPOSITION MASS % | EXAMPLE 7 BEFORE DECOMPOSITION MASS % | EXAMPLE 7 AFTER DECOMPOSITION MASS % | EXAMPLE 8 BEFORE DECOMPOSITION MASS % | EXAMPLE 8 AFTER DECOMPOSITION MASS % |
|---|---|---|---|---|---|---|---|---|
| $SiH_2Cl_2$ | 0.1 | 0.2 | 0.2 | 0.1 | 0.1 | 0.1 | 0.1 | 0.1 |
| $SiHCl_3$ | 1.5 | 22.1 | 1.8 | 18.9 | 2.1 | 20.7 | 3.2 | 19.3 |

TABLE 2-continued

| COMPOSITION | EXAMPLE 5 | | EXAMPLE 6 | | EXAMPLE 7 | | EXAMPLE 8 | |
| --- | --- | --- | --- | --- | --- | --- | --- | --- |
| | BEFORE DECOMPOSITION MASS % | AFTER DECOMPOSITION MASS % | BEFORE DECOMPOSITION MASS % | AFTER DECOMPOSITION MASS % | BEFORE DECOMPOSITION MASS % | AFTER DECOMPOSITION MASS % | BEFORE DECOMPOSITION MASS % | AFTER DECOMPOSITION MASS % |
| $SiCl_4$ | 62.0 | 73.2 | 57.8 | 74.3 | 60.0 | 76.8 | 60.0 | 78.0 |
| $Si_2H_2Cl_4$ | 14.7 | 0.3 | 12.4 | 0.8 | 12.6 | 0.8 | 12.3 | 1.0 |
| $Si_2Cl_6$ | 18.7 | 0.5 | 19.4 | 1.2 | 21.3 | 0.5 | 21.4 | 0.7 |
| OTHERS | 3.0 | 3.7 | 8.4 | 4.7 | 3.9 | 1.1 | 3.0 | 0.9 |
| POLYMER INPUT AMOUNT | 200 g/min | | 200 g/min | | 200 g/min | | 200 g/min | |
| HCl GAS INPUT AMOUNT | 40 g/min | | 20 g/min | | 60 g/min | | 40 g/min | |
| DECOMPOSITION FURNACE TEMPERATURE | 700° C. | | 520° C. | | 540° C. | | 560° C. | |
| PRECIPITATION | SMALL AMOUNT | | SMALL AMOUNT | | SMALL AMOUNT | | SMALL AMOUNT | |

(Note)
The expression "before decomposition" denotes the composition of the polymer containing liquid before being mixed with hydrogen chloride.
The expression "after decomposition" denotes the composition of the gas that has been extracted from the decomposition furnace.

Comparative Example 1, Examples 9 and 10

The Comparative Example 1 is an example in which the decomposition temperature (300° C.) is lower than the range of the present invention; Example 9 is an example in which the decomposition temperature (900° C.) is higher than the preferred range of the present invention; and Example 10 is an example in which the supply rate (6 g/min) of the hydrogen chloride is lower than the preferred range of the present invention. Other than the above conditions, the polymers are decomposed to produce TCS in a manner similar to Examples 1 to 3. These results are shown in TABLE 3.

amount of trichlorosilane was remarkably small. In Example 9, the produced amount of trichlorosilane was lower than those in Examples 1 to 8, and in Example 10, a large amount of precipitate is generated inside the furnace.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

TABLE 3

| COMPOSITION | BEFORE DECOMPOSITION MASS % | COMP. EX. 1 AFTER DECOMPOSITION MASS % | EXAMPLE 9 AFTER DECOMPOSITION MASS % | EXAMPLE 10 AFTER DECOMPOSITION MASS % |
| --- | --- | --- | --- | --- |
| $SiH_2Cl_2$ | 0.1 | 0.1 | 0.1 | 0.2 |
| $SiHCl_3$ | 1.0 | 2.0 | 12.9 | 17.9 |
| $SiCl_4$ | 58.8 | 60.9 | 85.0 | 75.5 |
| $Si_2H_2Cl_4$ | 15.6 | 14.1 | 0.3 | 0.4 |
| $Si_2Cl_6$ | 20.6 | 19.5 | 0.2 | 1.0 |
| OTHERS | 3.9 | 3.4 | 1.5 | 5.0 |
| POLYMER INPUT AMOUNT | — | 200 g/min | 200 g/min | 200 g/min |
| HCl GAS INPUT AMOUNT | — | 40 g/min | 40 g/min | 6 g/min |
| DECOMPOSITION FURNACE TEMPERATURE | — | 300° C. | 900° C. | 520° C. |
| PRECIPITATION | — | SMALL AMOUNT | SMALL AMOUNT | LARGE AMOUNT (OPERATION SUSPENDED) |

(Note)
The expression "before decomposition" denotes the composition of the polymer containing liquid before being mixed with hydrogen chloride.
The expression "after decomposition" denotes the composition of the gas that has been extracted from the decomposition furnace.

As shown in TABLE 1 and TABLE 2, according to the manufacturing method according to the present invention, because substantially all of the polymers present before processing takes place were decomposed and converted to trichlorosilane, the trichlorosilane yield was high. In contrast, as shown in TABLE 3, in the Comparative Example 1, the decomposition rate of the polymers was low and the

What is claimed is:

1. A method for manufacturing polycrystalline silicon, comprising the steps of:

a) reacting a metallurgical grade silicon and hydrogen chloride in a chlorination reactor to produce chlorosilanes, including crude trichlorosilane, and polymer containing high boiling chlorosilane compounds which have boiling points higher than a boiling point of silicon tetrachloride;

b) distilling the chlorosilanes and the polymer in a first distillation column to obtain a purified trichlorosilane from and a distillation residue including the polymer;

c) mixing, in an evaporator, the purified trichlorosilane from the first distillation column, with hydrogen, trichlorosilane, and silicon tetrachloride, which are recovered from downstream steps, to produce a raw material gas;

d) introducing the raw material gas into a reactor, in which silicon rods are heated to a temperature of 900° C. to 1200° C., to deposit polycrystalline silicon on the silicon rods;

e) cooling an exhaust gas from the reactor of step d) in a condenser to obtain liquefied chlorosilanes and a gas including hydrogen and hydrogen chloride;

f) separating the hydrogen from the hydrogen chloride and feeding the hydrogen back to the evaporator of step c);

g) distilling the liquefied chlorosilanes from the condenser of step e) to obtain a residue containing polymers and distilled chlorosilanes containing trichlorosilane and silicon tetrachloride;

h) introducing a first portion of the distilled chlorosilanes obtained in step g) into a trichlorosilane conversion step via a second evaporator;

i) reacting silicon tetrachloride in the first portion of the distilled chlorosilanes with hydrogen in the trichlorosilane conversion step at a high temperature of 800° C. or more and 1300° C. or less to produce trichlorosilane;

j) introducing a gas including the produced trichlorosilane in step i) into a condenser to obtain a liquefied stream;

k) returning the liquefied stream obtained in step j) to the distilling of step g);

l) supplying a second portion of the distilled chlorosilanes obtained from the distilling of step g) to the evaporator of step c);

m) supplying the polymers from the distilling the liquefied chlorosilanes of step g) and the polymer from the first distillation column of step b) to a decomposition furnace through a first supply pipe which extends from a top to a bottom of the decomposition furnace by meandering in a spiral shape while preheating the polymer in the first supply pipe;

n) supplying hydrogen chloride to the decomposition furnace through a second supply pipe which extends from the top to the bottom of the decomposition furnace in a straight pipe while preheating the hydrogen chloride in the second supply pipe;

o) mixing the preheated polymers supplied through the first supply pipe and the preheated hydrogen chloride supplied through the second supply pipe in the decomposition furnace to react the polymer and the hydrogen chloride at a temperature of 450° C. to 700° C. in the decomposition furnace to obtain products including trichlorosilane and silicon tetrachloride; and p) introducing the products obtained in step o) into the chlorination reactor of step a), wherein the polymers and the hydrogen chloride are not mixed during the preheating steps and do not react with each other during the preheating step so that reactants adhering to and obstructing an inside of the first and second supply pipes will not occur.

2. A method for manufacturing polycrystalline silicon according to claim 1, wherein an amount of the hydrogen chloride used in step o) accounts for 10 to 30 mass % with respect to the polymer.

* * * * *